Feb. 7, 1967     T. D. McMINN, JR     3,303,230
CONTROL OF ALKYLATION CATALYST ACTIVITY
Filed Dec. 20, 1963
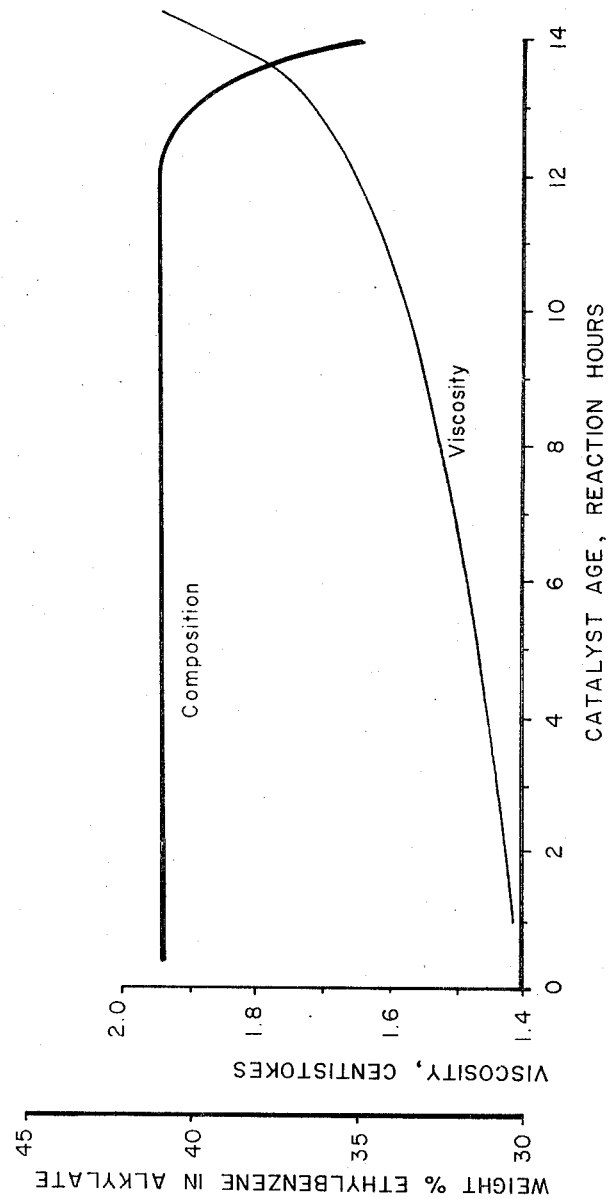
INVENTOR.
Talmage D. McMinn, Jr.
BY
ATTORNEY United States Patent Office 3,303,230
Patented Feb. 7, 1967

3,303,230
CONTROL OF ALKYLATION CATALYST ACTIVITY
Talmage D. McMinn, Jr., Texas City, Tex., assignor to Monsanto Company, a corporation of Delaware
Filed Dec. 20, 1963, Ser. No. 332,256
7 Claims. (Cl. 260—671)

The present invention is concerned with an improved process for alkylating an aromatic hydrocarbon in the presence of a Friedel-Crafts type catalyst. More particularly, this invention relates to a method for continuously determining the activity of an organo-metallic catalyst complex during the alkylation of an aromatic hydrocarbon with an olefin.

The reaction of alkylating agents such as olefins and alkyl halides with aromatic compounds in the presence of a metal halide is well known and widely used in industry. It is well understood that in this reaction the active catalyst is not the solid metal halide itself, but an organometal halide complex comprising the metal halide and aromatic compounds and probably also comprising some of the alkylated aromatic compound and an acid. This substance, which is commonly termed "catalyst complex," resembles a heavy oil in consistency, is usually brown to black in color, and has a somewhat variable composition depending upon the reactants in the system.

In the usual continuous operation, an aromatic hydrocarbon and an olefin are reacted in the presence of an aluminum chloride catalyst complex to produce an alkylate liquor. The catalyst complex is prepared separately and circulated continuously to the alkylation reactor. Usually, so-called promoters such as ethyl chloride and hydrochloric acid are required and are added in small amounts to either the benzene or ethylene in the case of the production of ethylbenzene or even added to the reaction liquor itself for the purpose of accelerating the reaction. Catalyst complex is readily separated from the alkylate liquor because of the difference in specific gravities, by flowing the reaction mixture into a separator provided with separate draw-off lines for the lighter alkylate liquor and the heavier catalyst complex. The catalyst complex is then returned to the reactor for reuse.

In the alkylation reactor, aluminum chloride acts as a strong Lewis acid in catalyzing the reaction. Strong Lewis bases, such as water, some sulfur compounds, polynuclear aromatics, and others, poison the catalyst complex by tying up aluminum chloride as a stable complex. Although benzene purity is maintained at an economically high-level and is dried by azeotropic distillation, traces of moisture and other impurities are accumulated in the catalyst complex destroying its effectiveness. In addition, some of the side-reaction products tend to accumulate and poison the catalyst complex. Thus, over a period of time the catalyst complex gradually loses its activity and in practice, a satisfactory level of activity is maintained by continuous removal of a portion of the circulating complex and the addition of fresh aluminum chloride and promoters to fortify the catalyst complex.

Control of the catalyst complex activity in the past has been based primarily upon the experience and judgment of the operating personnel. While the existence of the problem of periodically determining and controlling the catalyst activity has been generally recognized, there has not been found a simple and accurate means for determining catalyst activity in order to maintain it at the high level required in the process for maximum production of alkylate product. Many methods have been suggested, but most of these are either long and tedious analytical procedures or are not reliable enough in the critical range needed. The known methods also provide only limited control since there is a significant time lag betwen the withdrawal of samples and the determination of activity based on laboratory testing. As a result, the operating personnel tend to use a much higher fresh aluminum chloride feed rate than necessary as insurance against loss of activity and this causes unreasonably high expenditures for fresh aluminum chloride.

It has now been discovered in accordance with the present invention that the activity of Friedel-Crafts catalyst complexes used in the alkylation of an aromatic hydrocarbon can be determined directly by the viscosity of the catalyst complex and failure of the catalyst complex can thus be prevented.

It is an object, therefore, of this invention to provide a simple, sensitive and inexpensive method for determining the alkylation catalyst activity when alkylating an aromatic hydrocarbon with an olefin in the presence of an organo-metal halide catalyst complex. Another object of this invention is to obtain a continuous and accurate control means for maintaining the activity of an organo-metal halide catalyst complex in the alkylation of an aromatic hydrocarbon. Still another object of the invention is to determine catalyst activity conditions in the alkylation of an aromatic hydrocarbon so as to produce a constantly high yield of alkylate product. Further objects and advantages of the invention will be apparent from the following description, drawing and appended claims.

According to the present invention, the catalyst activity of a liquid Friedel-Crafts type alkylation catalyst complex used in the alkylation of an aromatic hydrocarbon is maintained at a high level by measuring the viscosity of the catalyst complex during the reaction and adding metal halide in an amount sufficient to obtain a predetermined viscosity and thereby maintain the activity of the catalyst complex at the desired level.

While the process is described with reference to the preferred embodiment wherein ethylbenzene is produced from the reaction of ethylene and benzene in the presence of an aluminum chloride catalyst complex, it will be understood that the method is generally applicable to all Friedel-Crafts type alkylations of aromatic compounds. The following examples are, therefore, given to illustrate the invention and are not to be construed as limiting it in any manner whatsoever.

*Example I*

A liquid aluminum chloride catalyst complex was prepared by reacting metallic aluminum and hydrogen chloride in the presence of a hydrocarbon alkylate consisting of benzene, ethylbenzene and polyethylbenzenes produced from an alkylation reaction of benzene and ethylene.

In the presence of the catalyst complex prepared above, benzene was alkylated with ethylene in an atmospheric laboratory reactor at a temperature of about 85° C. Samples of the alkylate were analyzed every two hours for ethylbenzene by gas chromatography. A portion of the catalyst complex was sampled every two hours to determine the viscosity of the catalyst complex and the sample was then returned to the alkylation reaction.

The viscosity of the catalyst complex was determined in a temperature controlled modified Fenske-type viscosimeter. The catalyst complex sample was passed through the viscosimeter at a controlled temperature of 85° C. and the elapsed time was accurately measured. This time measurement was converted by the standard arithmetic conversion to viscosity in centistokes. The results are shown in Table I and on the drawing.

TABLE I

| Time, Hrs. | Viscosity of Catalyst Complex, Centistokes | Ethylbenzene in Alkylate, Wt. Percent |
|---|---|---|
| 1 | 1.42 | 40.8 |
| 3 | 1.42 | 40.4 |
| 5 | 1.48 | 41.5 |
| 7 | 1.51 | 40.8 |
| 9 | 1.56 | 41.6 |
| 11 | 1.62 | 40.7 |
| 13 | 1.72 | 40.6 |
| 14 | 1.88 | 35.1 |

It will be apparent from the table above and from the drawing that the change in viscosity of the catalyst complex correlates directly with changes in ethylbenzene concentration of the alkylate. It is noted that the viscosity increases gradually throughout most the run of 14 hours, but takes an abrupt jump where the catalyst complex begins to lose its activity.

Considerable latitude may be exercised in the choice of conditions for the alkylation reaction and remain within the scope of this invention. The alkylation reaction can be carried out in any type of suitable reactor, either in a continuous or batch-wise fashion. The apparatus and technique employed in the process have been adequately described in the alkylation art and do not form a part of this invention. Generally, the reaction is effected by introducing the preformed catalyst complex, benzene, hydrogen chloride and the ethylene alkylating agent, in the case of the production of ethylbenzene, into the reaction zone maintained at a temperature in the range from about 60° C. to about 150° C. Reaction temperatures in the range from about 70° C. to about 90° C. are preferred when the reaction is conducted under the usual atmospheric pressure. The alkylation reaction may, however, be carried out at superatmospheric pressures ranging from 80 to about 300 p.s.i.g. if desired and at these pressures, the higher temperatures prevail.

Generally, from 1 to 2.5 parts by weight of catalyst complex are employed per part of benzene, but preferably the catalyst complex-benzene ratio is kept at approximately 2 to 1. A suitable benzene-ethylene weight ratio lies in the range from about 4:1 to about 7:1 and preferably a ratio of about 6:1 is used.

The amount of hydrogen halide such as hydrogen chloride ordinarily employed as a promoter in the alkylation reaction, may vary from a minimum of 1 part by weight per thousand parts of ethylene to 1 part for every 10 parts of ethylene. Most beneficial results are obtained when a hydrogen chloride to ethylene ratio of 1:100 is employed.

As mentioned previously, the invention has been described for the purpose of clarity with special reference to the preparation of ethyl-benzene, but it may be applied to producing other alkylated aromatic compounds. For instance, the method may be employed in reacting ethylene with toluene to produce ethyltoluenes, in reacting propylene with benzene to poduce isopropylbenzene or polypropylbenzene, in reacting butylene with benzene to form a butylbenzene or polybutylbenzene, and the like.

The process of this invention is also applicable in transalkylation processes. It is well known that polyalkyl aromatic compounds such as polyethylbenzene may be reacted with an aromatic compound such as benzene in the presence of a Friedel-Crafts organo-metal halide catalyst complex to yield a monoalkylated compound such as ethylbenzene. The same problems of maintaining catalyst activity are presented in such dealkylation processes and the method of this invention may be utilized as successfully for determining and maintaining catalyst complex activity in dealkylation processes as it is in the alkylation process described.

The process of this invention is also applicable in combining alkylation-dealkylation processes and for methods where the polyalkylated aromatic compound is returned to the alkylation reaction to suppress the further formation of polyalkylated material and to direct the reaction to the formation of the monoalkylated product. The procedures for carrying out such reactions are well known and are not given in detail here.

The invention has now clearly shown that the activity of an organo-metal halide alkylation catalyst complex can be accurately measured and thereafter maintained by conventional techniques by measuring the viscosity of the catalyst complex and directly relating this viscosity to the catalyst activity as measured by the conversion of benzene and ethylene, for instance, to ethylbenzene.

What is claimed is:

1. In a process for the preparation of monoalkylated aromatic compounds in the presence of a liquid Friedel-Crafts organo-metal halide catalyst complex to produce both mono- and polyalkylated aromatic compounds and wherein said polyalkylated aromatic compounds are dealkylated in the presence of said catalyst complex, the steps which comprise determining the activity of said catalyst complex by measuring the viscosity of said catalyst complex and calculating the said activity therefrom and maintaining the activity of said catalyst complex at a high level by the addition of metal halide to said catalyst complex, said catalyst complex having been prepared by reacting metallic aluminum and hydrogen chloride in the presence of benzene, ethylbenzene and polyethylbenzenes.

2. In a process for the preparation of alkylated aromatic compounds wherein an olefin is reacted with an aromatic compound in the presence of a liquid Friedel-Crafts organo-metal halide catalyst complex and wherein the activity of said catalyst complex is maintained by the addition of fresh metal halide, the steps which comprise determining the viscosity of said catalyst complex and adding fresh metal halide to said catalyst complex in an amount to obtain a predetermined viscosity value and thereby maintain the activity of said catalyst complex at a high level, said catalyst complex having been prepared by reacting metallic aluminum and hydrogen chloride in the presence of benzene, ethylbenzene and polyethylbenzenes.

3. In a process for the preparation of monoalkylated aromatic compounds wherein polyalkylated aromatic compounds are dealkylated in the presence of a liquid Friedel-Crafts organo-metal halide catalyst complex and wherein the activity of said catalyst complex is maintained by the addition of fresh metal halide, the steps which comprise determining the viscosity of said catalyst complex and introducing fresh metal halide to said catalyst complex in an amount to obtain a predetermined viscosity value and thereby maintain the activity of said catalyst complex at a high value, said catalyst complex having been prepared by reacting metallic aluminum and hydrogen chloride in the presence of benzene, ethylbenzene and polyethylbenzenes.

4. The process of claim 2 in which said olefin is ethylene and said aromatic compound is benzene, said metal halide is aluminum chloride and said alkylated aromatic compounds are ethylbenzenes and polyethylbenzenes.

5. The process of claim 2 wherein the reaction of an olefin and an aromatic compound in the presence of a Friedel-Crafts organo-metal halide catalyst complex is promoted with a hydrogen halide.

6. The process of claim 3 in which said olefin is ethylene and said aromatic compound is benzene, said metal halide is aluminum chloride and said polyalkylated aromatic compounds are polyethylbenzenes.

7. The process of claim 3 wherein the reaction of an olefin and an aromatic compound in the presence of a Friedel-Crafts organo-metal halide catalyst complex is promoted with a hydrogen halide.

References Cited by the Examiner
UNITED STATES PATENTS

| | | | |
|---|---|---|---|
| 2,419,632 | 4/1947 | Day | 260—671 |
| 2,792,338 | 5/1957 | Davidson et al. | 260—683.57 X |
| 2,855,448 | 10/1958 | Goard | 260—683.57 |

DELBERT E. GANTZ, *Primary Examiner.*

C. R. DAVIS, *Assistant Examiner.*